Oct. 24, 1967

L. BERGMAN 3,349,312

IMPULSE COMMUTATED INVERTER WITH CONTROLLABLE
OUTPUT VOLTAGE

Filed Sept. 23, 1965

3 Sheets-Sheet 1

INVENTOR.
LARS BERGMAN
BY
Bailey, Stephens & Huettig
ATTORNEYS

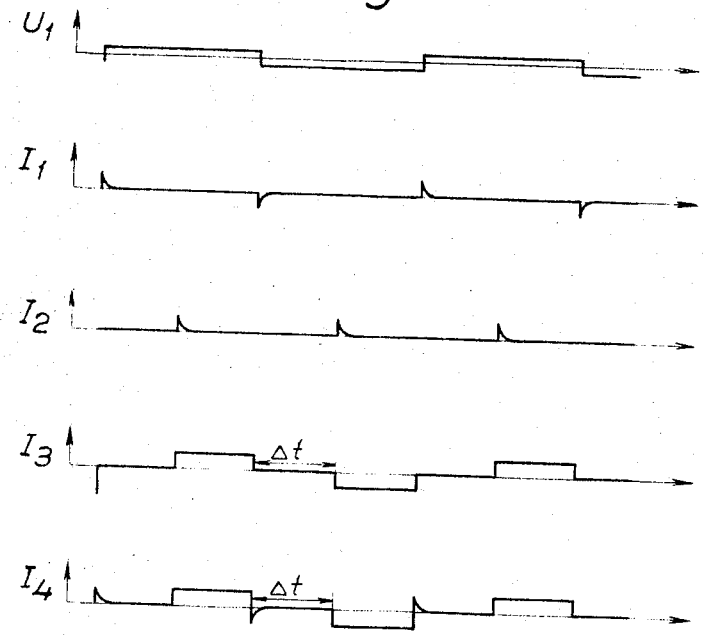
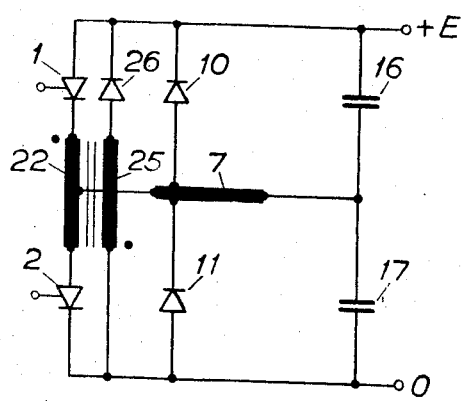

Oct. 24, 1967  L. BERGMAN  3,349,312
IMPULSE COMMUTATED INVERTER WITH CONTROLLABLE
OUTPUT VOLTAGE
Filed Sept. 23, 1965  3 Sheets-Sheet 3

INVENTOR.
LARS BERGMAN
BY
Bailey, Stephens & Huettig
ATTORNEYS

United States Patent Office 3,349,312
Patented Oct. 24, 1967

3,349,312
IMPULSE COMMUTATED INVERTER WITH CONTROLLABLE OUTPUT VOLTAGE
Lars Bergman, Roslags-Nasby, Sweden, assignor to Allmänna Svenska Elektriska Aktiebolaget, Vasteras, Sweden, a Swedish corporation
Filed Sept. 23, 1965, Ser. No. 489,568
Claims priority, application Sweden, Oct. 1, 1964, 11,776/64
14 Claims. (Cl. 321—5)

The present invention relates to an inverter with controllable output voltage, among other things provided with controllable semi-conductor rectifiers (thyristors) and a control pulse generator.

In an inverter with controllable semi-conductor rectifiers (thyristors) the cost of the controllable rectifiers constitutes a considerable part of the cost of the whole inverter. For this reason it is desirable to reduce the number of controllable rectifiers to a minimum.

It has previously been known to build single-phase inverters with unregulated output voltage with two controllable semi-conductor rectifiers and three-phase inverters with three controllable semi-conductor rectifiers. In inverters with controllable output voltage, it has not previously been possible to come down to this number of rectifiers.

The object of the present invention is to make this possible. The invention is characterized in that the control pulse generator of the inverter is arranged so that during a working cycle (a period of the generated A.C. voltage) it delivers two ignition pulses to each controllable semi-conductor rectifier, the time between which is variable. The first ignition pulse, which is of short duration, is fed to a rectifier which for the moment is non-conducting, upon which this rectifier, by means of commutating impedances, extinguishes a load current carrying rectifier, and then is itself extinguished without having taken over the loading current for any appreciable time. The second ignition pulse, which is of longer duration, again ignites the first mentioned rectifier, which then definitely takes over the load current.

Figure 1:
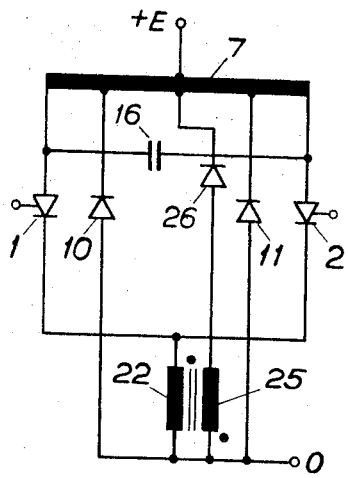
Figure 2:
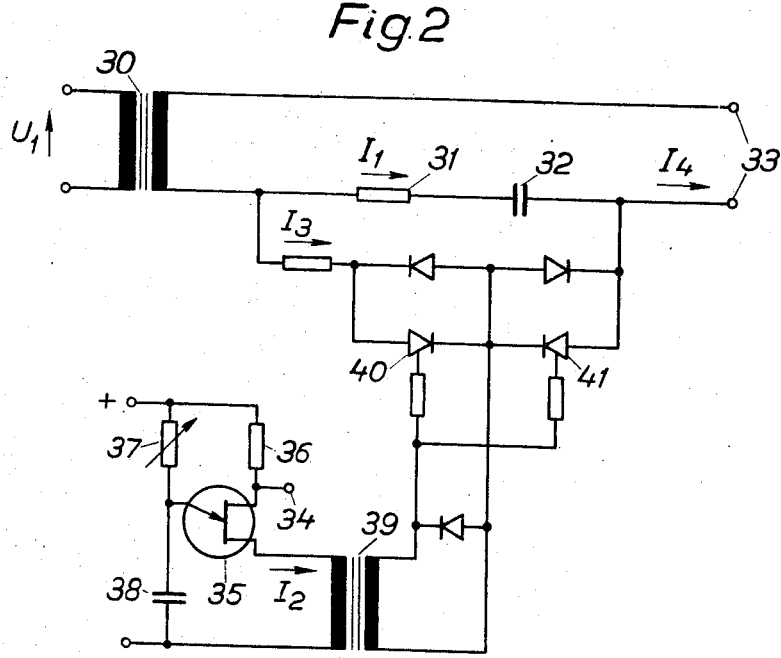
Figure 5:
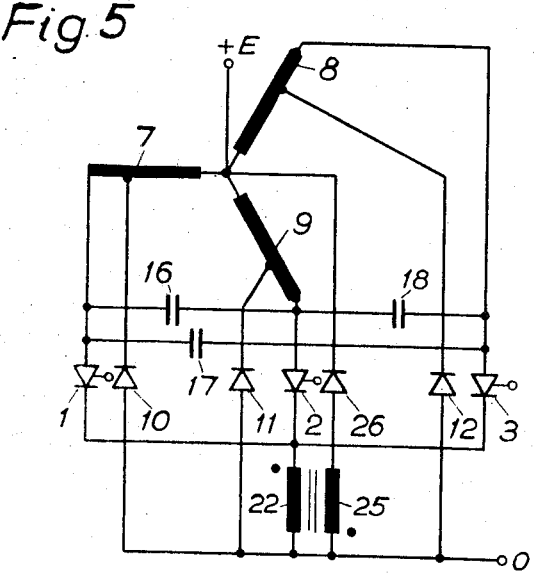
Figure 6:
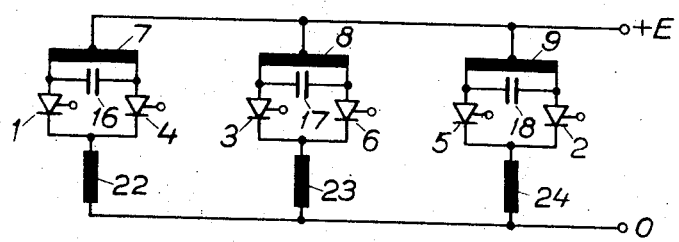
Figure 7:
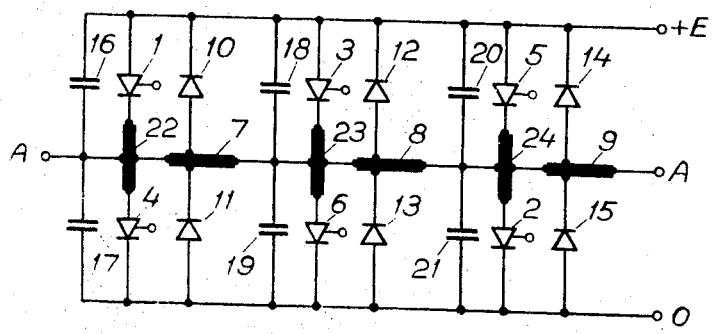

The invention will be described in more detail in connection with the accompanying drawings. FIGURE 1 shows a single-phase parallel inverter according to the invention. FIGURE 2 shows the principle of a control pulse generator for an inverter according to FIGURE 1, and FIGURE 3 an example of the curve forms occurring in the control pulse generator. FIGURE 4 shows a single-phase series inverter according to the invention. FIGURES 5, 6 and 7 show different embodiments of three-phase inverters according to the invention.

FIGURE 1 shows a single-phase parallel inverter according to the invention. 1 and 2 are controllable semi-conductor rectifiers, whose anodes are connected to the primary winding 7 on the inverter transformer and whose control electrodes are connected to a control pulse generator not shown, for example according to FIGURE 2. The load of the inverter is connected to the secondary winding of the transformer, not shown. The feed-back rectifiers 10 and 11 are connected to taps on the primary winding. The commutation capacitor 16 lies between the end points of winding 7. 22 is a commutation reactor. Assuming that rectifier 1 is conducting and rectifier 2 is non-conducting the commutation process is carried out in the following way. Rectifier 2 is supplied with a short ignition pulse, whose length is less than the period of the oscillation occurring during the commutation, which period is mainly determined by the commutation impedances. Upon the ignition of rectifier 2 the commutation capacitor 16 is discharged through rectifier 2 and rectifier 1 in the blocking direction of the latter, whereby rectifier 1 is turned off. By co-operation between the commutation capacitor 16 and the commutation reactor 22, an oscillation is produced and by suitable dimensioning of the commutation impedances 16 and 22 and suitable positioning of the taps on winding 7 of the feed-back rectifiers 10 and 11, the result is obtained that, during all load conditions normally occurring, the rectifier 2 receives a blocking voltage after a certain time and is turned off. When the rectifier 2 receives the second ignition pulse, it is ignited and begins to conduct the load current. Now an oscillation process also occurs, caused by the commutation impedances, and rectifier 2 may receive a blocking voltage for a short interval. In order to prevent the rectifier from being turned off, it is suitable to make the second ignition pulse relatively long, for example as long as the time the rectifier will carry the load current.

The voltage of the inverter can be varied by variation of the interval between the first and the second ignition pulse. In order to reduce the peak value of the voltage across the commutation reactor 22 and thereby the losses of the inverter, according to an embodiment of the invention, the reactor can be provided with a secondary winding 25, which in series with a rectifier 26 is connected between the two poles of the D.C. supply.

An example of the control pulse generator for the inverter in FIGURE 1 is shown in FIGURE 2. A square voltage $U_1$ (see FIGURE 3) with the same frequency as the voltage of the inverter is supplied to the transformer 30. Thus the current $I_1$ (see FIGURE 3) will pass through the RC-circuit 31–32. This current consists of short pulses at 180° intervals and with alternately positive and negative polarity. These current pulses constitute the above mentioned "first ignition pulse" and are in a suitable way alternately supplied to the rectifiers 1 and 2 in FIGURE 1. At the same time as each current pulse, i.e. at the beginning of each half period, a short negative synchronizing pulse is fed to the connection 34 of the oscillator which consists of the resistors 36 and 37, the uni-junction transistor 35, and the capacitor 38. The capacitor 38 then starts charging and after a certain time, $\Delta t$, determined by the time constant of the emitter circuit, which can be varied for example by means of a variable resistor 37, a current pulse $I_2$ is produced through the transformer 39. The one of the thyristors 40 and 41 which at this instant has positive anode voltage ignites and the voltage $U_1$ is connected directly to the terminals 33 and thereby to that of the thyristors 1 and 2 which is to be ignited. The said "second ignition pulse" mentioned previously is thus constituted by the current $I_3$, which is illustrated in FIGURE 3, and the pulse thus lasts in this case until the end of the conducting interval of the rectifier. The resultant ignition current $I_4$ is the sum of the currents $I_1$ and $I_3$ (see FIGURE 3). Every other half period of $I_4$ is thus supplied to rectifier 1 in FIGURE 1 and every alternate one to rectifier 2, for example by means of a simple diode arrangement.

The invention can also be applied to a series inverter, for example according to FIGURE 4, where the designations agree with FIGURE 1. The right-hand end point of the winding 7 can, instead of being connected to the capacitors 16 and 17, be connected to a centre tap on the D.C. supply or also to a further series inverter, whereby a bridge connected inverter is produced.

The invention makes it possible to build a controllable three-phase inverter with only three controllable rectifiers (see FIGURE 5). The numerals 1, 2 and 3 are the controllable rectifiers. The numerals 7, 8 and 9 are the primary windings of the inverter transformer, whose connection point is connected to one pole of the D.C. supply. The secondary winding of the transformer, not shown, to which the load is connected, is suitably delta-connected. The numerals 10, 11, 12 are the feed-back rectifiers which are connected to suitably placed winding taps. The numerals 16, 17, 18 are commutation capacitors, which may also be star-connected. The commutation reactor has the main winding 22 and the extra winding 25, which in series with the rectifier 26, lies between the two poles of the D.C. supply. The circuit works in the same way as that in FIGURE 1, merely with the difference that the maximum conducting interval of each rectifier is 120° instead of 180°. When the rectifier 1 conducts and rectifier 2 receives its first short ignition pulse, the rectifier 1 is turned off, after which rectifier 2 is turned off. When rectifier 2 receives the second long ignition pulse, it is turned on and conducts until it is turned off by rectifier 3. The extra winding 25 of the commutation reactor and the rectifier 26 also here serves to limit the voltage across the reactor, whereby the losses are reduced.

A three-phase controllable inverter according to the invention can also be designed according to FIGURE 6, where three parallel inverters according to FIGURE 1 operate with 120° phase displacement.

FIGURE 7 shows a further example of a three-phase controllable inverter within the scope of the invention. The inverter consists of three series inverters connected together and working with a phase displacement of 120°. (The two points denoted by A are to be considered as directly connected with each other.)

Compared with the connection according to FIG. 5, the two last mentioned connections have, however, the disadvantage that it is necessary to have six controllable rectifiers instead of three.

The invention makes it possible that the number of controllable rectifiers in controllable inverters may be reduced compared with earlier known arrangements, namely to two for single-phase and three for three-phase inverters.

The invention may be applied to several kinds of unregulated inverters, not shown here, whereby these inverters can be made controllable without it being necessary to increase the number of controllable rectifiers. There is thus a large number of alternative embodiments within the scope of the invention and the embodiments shown on the drawings only serve to illustrate the invention.

I claim:
1. An inverter with controllable output voltage having controlled semi-conductor rectifiers, commutation elements for turning off said rectifiers connected to said rectifiers and comprising a commutating circuit having at least one commutating reactor and at least one commutating capacitor, a control pulse generator means connected to the control electrodes of said rectifiers to supply control pulses thereto, said control pulse generator means including means for supplying two control pulses to each controllable rectifier during each cycle of the output voltage of the inverter, means for varying the time interval between said control pulses, the first control pulse having shorter duration than the period of oscillation of the commutating circuit, the second control pulse having a duration longer than said period of oscillation.

2. An inverter as claimed in claim 1, having a transformer with a primary winding connected to said controlled rectifiers, said primary winding having taps, and feed-back valves connected to the taps on said primary winding, the dimensions of said commutating reactor and capacitor and the location of the taps on said primary winding being such that a controlled rectifier after having turned off a previously conducting rectifier is itself turned off as a result of the oscillation of the commutating elements.

3. An inverter as claimed in claim 1, the end of said second control pulse coinciding with the end of the interval during which the controlled rectifier to which the pulse is supplied carries the load current.

4. An inverter as claimed in claim 1, a D.C. supply, said commutating reactor having a primary winding connected to a controlled rectifier and a secondary winding connected between the two poles of the D.C. supply.

5. An inverter as claimed in claim 1, said inverter being a parallel inverter.

6. An inverter as claimed in claim 1, said inverter being a series inverter.

7. An inverter as claimed in claim 1, for generating a three-phase voltage, comprising three single-phase parallel inverters, a D.C. supply, said inverters being connected in parallel to the D.C. supply, and working with a mutual phase displacement of 120°.

8. An inverter as claimed in claim 1, for generating a three-phase voltage, comprising three single-phase series inverters, a D.C. supply, said inverters being connected in parallel to the D.C. supply and working with a mutual phase displacement of 120°.

9. An inverter as claimed in claim 1, for generating a three-phase voltage, comprising three single-phase series former, a D.C. supply, said transformer having a star-connected primary winding whose neutral point is connected to one terminal of the D.C. supply, each of the three phase terminals of said winding being connected in series with a controlled rectifier to one end of the commutating reactor, the other end of the commutating reactor being connected to the other terminal of the D.C. supply.

10. An inverter as claimed in claim 1, said control pulses being derived from a square wave voltage.

11. An inverter as claimed in claim 10, said square wave voltage being connected to the control electrodes of the controlled rectifiers in series with a resistor and a capacitor.

12. An inverter as claimed in claim 11, including means for shunting said resistor and capacitor to generate said second pulse.

13. An inverter as claimed in claim 12, said shunting means comprising a controlled rectifier.

14. An inverter as claimed in claim 13, uni-junction transistor means having an emitter circuit, said controlled rectifier having its control electrode connected to said uni-junction transistor means, the emitter circuit of said uni-junction transistor having a variable time constant.

References Cited
UNITED STATES PATENTS

| | | | |
|---|---|---|---|
| 3,311,809 | 3/1967 | Corey et al. | 321—45 |
| 3,319,147 | 5/1967 | Napham | 321—45 X |

OTHER REFERENCES

Bedford/Hoft: Principles of Inverter Circuits, John Wiley and Sons, Inc., N.Y., 1964, TK 2796B37 c. 2, Chapter 7, pp. 165–230.

JOHN F. COUCH, *Primary Examiner.*

W. BEHA, *Assistant Examiner.*